United States Patent [19]

Blount

[11] 4,383,078
[45] * May 10, 1983

[54] PROCESS FOR THE PRODUCTION OF ALKALI METAL POLYHYDROXY LIGNIN-CELLULOSE POLYMER

[76] Inventor: David H. Blount, 5450 Lea St., San Diego, Calif. 92105

[*] Notice: The portion of the term of this patent subsequent to Oct. 7, 1997, has been disclaimed.

[21] Appl. No.: 295,843

[22] Filed: Aug. 24, 1981

Related U.S. Application Data

[63] Continuation-in-part of Ser. No. 207,391, Nov. 17, 1980, Pat. No. 4,336,340, which is a continuation-in-part of Ser. No. 134,975, Mar. 3, 1980, Pat. No. 4,283,311, which is a continuation-in-part of Ser. No. 13,139, Feb. 21, 1979, Pat. No. 4,226,982.

[51] Int. Cl.$^3$ .................. C08J 9/02; C08G 18/02
[52] U.S. Cl. .................. 524/733; 521/84; 521/125; 521/130; 521/175
[58] Field of Search .................. 536/56, 101; 260/17.4 CL, 17.4 UC, 9; 521/84, 125, 130, 175; 524/733

[56] References Cited

U.S. PATENT DOCUMENTS 3,312,642 4/1967 Schwenker et al. ........ 260/17.4 UC
3,839,173 10/1974 Blaszczak ................. 260/9
4,032,483 6/1977 Hartman .................. 260/9
4,033,913 7/1977 Sunden .............. 260/17.4 CL
4,100,328 7/1978 Gallagher ................ 260/9
4,153,768 5/1979 Blount .................. 521/130
4,170,697 10/1979 Blount .................. 521/130
4,220,757 9/1980 Blount ................... 536/84
4,226,982 10/1980 Blount .................. 536/101
4,283,311 8/1981 Blount .................. 521/125

OTHER PUBLICATIONS

Chemical Abstracts, Ninth Collective Index, vols. 76–85, 1972–1976, Items 10313cs, 10314cs, 10317cs, 10318cs, 10320cs, 10321cs, 10322cs, 10323cs, 10324cs, 10327cs and 10385cs.
Chemical Abstracts, vol. 67, No. 16, Oct. 16, 1967, Items 74617m & 74618n.

Primary Examiner—Ronald W. Griffin

[57] ABSTRACT

Alkali metal polyhydroxy lignin-cellulose polymer is produced by reacting an organic polyhydroxy compound with broken-down alkali metal lignin-cellulose polymer. The alkali metal polyhydroxy lignin-cellulose polymer will react with polyisocyanate to produce foam products which may be used for thermal or sound insulation.

30 Claims, No Drawings

PROCESS FOR THE PRODUCTION OF ALKALI METAL POLYHYDROXY LIGNIN-CELLULOSE POLYMER

CROSS-REFERENCE TO RELATED APPLICATIONS

This application is a continuation-in-part of U.S. patent application, Ser. No. 207,391, filed Nov. 17, 1980, now U.S. Pat. No. 4,336,340, which is a continuation-in-part of U.S. patent application, Ser. No. 134,975, filed Mar. 3, 1980, now U.S. Pat. No. 4,283,311, which is a continuation-in-part of U.S. patent application, Ser. No. 013,139, filed Feb. 21, 1979, now U.S. Pat. No. 4,226,982.

BACKGROUND OF THE INVENTION

This invention relates to a process for the production of alkali metal polyhydroxy lignin-cellulose polymer, utilizing a water-soluble broken-down lignin-cellulose polymer and an organic polyhydroxy compound. The hydroxyl groups react with the carboxyl groups and epoxide groups present on the broken-down alkali metal lignin-cellulose polymer to produce an alkali metal polyhydroxy lignin-cellulose polymer.

The alkali metal polyhydroxy lignin-cellulose polymer may be utilized to produce polyurethane resinous and foam products which may be utilized for thermal and sound insulation, to produce polyester resins, to produce epoxy resins and may be further reacted with isocyanate compounds, salt-forming compounds, aldehyde compounds, polycarboxylic acid compound, polycarboxylic anhydride compounds, halohydrins, epihalohydrins, vinyl monomers and other organic compounds to produce new and useful resins and compounds.

The alkali metal polyhydroxy lignin-cellulose may be reacted with a salt-forming compound to produce a polyhydroxy lignin-cellulose polymer which may be reacted with polyisocyanates to produce useful polyurethane resinous and foam products.

The alkali metal hydroxy lignin-cellulose polymer may be produced in the form of liquid or solid polymer. The polymers are usually water-soluble.

The alkali metal polyhydroxy lignin-cellulose polymer is produced by reacting the following components:
Component (a): Broken-down alkali metal lignin-cellulose polymer;
Component (b): Organic polyhydroxyl compound.

COMPONENT (A)

Component (a), a broken-down alkali metal lignin-cellulose product, is produced by the processes outlined in my copending U.S. patent application, Ser. No. 013,139, filed Feb. 21, 1979, now U.S. Pat. No. 4,226,982, and is incorporated into this invention.

Water-soluble, broken-down, alkali metal lignin-cellulose polymers and carbohydrates are produced by mixing 3 parts by weight of a cellulose-containing plant or plant derivative and 2 to 5 parts by weight of an alkali metal hydroxide, then heating the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, vines, straw, flowers, kelp, algae and mixtures thereof. Wood is the preferred plant. Commercial and agricultural waste products may be used, such as stalks, paper, cotton clothes, bagasses, etc. Wood fibers (wood pulp) with lignin removed may be used in this invention. Plants that have been partially decomposed, such as humus, peat, certain soft brown coal, manure containing cellulose, etc., may also be used in this invention.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The novel broken-down water-soluble alkali metal lignin-cellulose polymer produced by the process of this invention differs from the alkali cellulose polymers produced by the known processes. The broken-down alkali metal lignin-cellulose polymer is dark brown to black in color, has at least one —COH radical removed from each cellulose molecule, the usual lignin-cellulose bond is not broken in most of the cases and the cellulose molecules are broken down into smaller molecules of alkali metal broken-down lignin-cellulose which are water-soluble. When a cellulose polymer such as cotton or wood with the lignin removed is reacted with an alkali metal hydroxide by the process of this invention, a black water-soluble broken-down alkali metal cellulose polymer is produced; this polymer may be reacted with a mineral acid until the pH is about 6 and a black, foamed, broken-down cellulose resinous product and carbohydrates are produced. The foam is produced by the release of $CO_2$ which was removed from the cellulose polymer. When a mineral acid is added to an aqueous solution of the broken-down alkali metal lignin-cellulose polymer until the pH is about 6, a black resinous product floats to the top and is recovered and the carbohydrates are in the solution.

COMPONENT (B)

Any suitable organic polyhydroxyl compound may be used in this invention. Suitable organic polyhydroxyl compounds include, but are not limited to ethylene glycol; propylene-1,2- and -1,3-glycol; butylene-1,4- and -2,3-glycol; hexane-1,6-diol; octane-1,8-diol; neopentyl glycol; cyclohexanedimethol(1,4-bis-hydroxymethylcyclohexane; 2-methyl-propane-1,3-diol; glycerol; trimethylol propane; hexane-1,2,6-triol; butane-1,2,4-triol; trimethylol ethane; pentraerythritol; diethylene glycol; polyethylene glycol; polypropylene glycol; polybutylene glycol; polyether diols; polyether triols; polyether polyhydroxy compounds; resorcinol; Bisphenol A and the like and mixtures thereof.

Any suitable organic compound which will react with the broken-down alkali metal plant polymer may be added with the organic polyhydroxy compound or to the alkali metal polyhydroxy lignin-cellulose polymer. Suitable organic compounds include substituted organic compound, polyisocyanates, aldehydes, monohydroxy organic compounds, organic epoxide compounds and mixtures thereof.

Any suitable salt-forming compounds may be used to react with the alkali metal radical of the alkali metal polyhydroxy lignin-cellulose polymer to produce polyhydroxy lignin-cellulose polymer. Suitable salt-forming compounds include, but are not limited to, mineral acids, e.g., sulfuric acid, hydrochloric acid, nitric acid, phosphoric acid, organic acid, e.g., formic acid, acetic acid, propionic acid, acrylic acid, methacrylic acid, adipic acid, phthalic acid, phthalic anhydride, maleic acid, maleic anhydride and the like.

Any suitable substituted organic compound, having at least 1 carbon atom which is attached to at least one substituent which will split off during the reaction to said broken-down alkali metal plant polymer in the amount wherein the mols of the substituted radicals are about equal to the mols of the alkali metal radicals in the mixture, may be used in this invention. The substituted group includes acid sulfate, nitrate, acid phosphate, bicarbonate, formate, acetate, propionate, laurate, oleate, stearate, oxalate, acid malonate, acid tartrate, acid citrate, halogens and mixtures thereof.

Suitable substituted organic compounds include, but are not limited to, disubstituted ethyl ether, disubstituted methyl ether, disubstituted ethoxy ethyl ether, disubstituted thio ethyl ether; disubstituted 1,3-methoxy-22-dimethyl propane; disubstituted dipropyl formal, disubstituted para-diethoxy benzene, disubstituted dimethoxy ethane, disubstituted diethyl carbonate, disubstituted glycol diacetate, disubstituted dibenzyl ether, disubstituted diphenyl ether, disubstituted diethyl sulphone, disubstituted propyl ether, disubstituted benzene, disubstituted paraxylene, disubstituted dibenzyl, disubstituted para hexyl propyl benzene; disubstituted 3-toyl propene-2; and polyhalogenated organic compounds, e.g., methylene chloride or bromide, ethylene dichloride, ethylene dibromide, propylene dichloride or dibromide, halohydrins, epihalohydrin, vinylidene chloride, dichloroacetic acid, dihalides of unsaturated hydrocarbon gases derived from pressure-cracking processes, natural gas-cracking processes as well as compounds having more than two substituents each as 1,1,2-trichloroethane; 1,2,4-trichlorobutane; 1,2,3,4-tetrachlorobutane; trichloromesitylene and the like. Mixtures of these compounds may be used in this invention.

Suitable mono-substituted organic compounds include, but are not limited to, substituted alkyl compounds such as methyl halides, methyl sulfate, methyl hydrogen sulfate, methyl hydrogen phosphate, methyl nitrates, ethyl halides, ethyl sulfate, ethyl hydrogen sulfate, ethyl hydrogen phosphate, ethyl nitrate, ethyl oxalate, propyl halides, propyl hydrogen sulfate; 1-nitropropane; 2-nitropropane; propyl hydrogen phosphate; butyl halides; butyl hydrogen sulfate; 2-nitro-1-butanol; butyl hydrogen phosphate; substituted unsaturated compounds, e.g., vinyl chloride, vinyl bromide, vinyl acetate, substituted carboxylic acids, e.g., chloroacetic acid, sodium chloroacetate, bromoacetic acid, iodoacetic acid, γ-chloropropionic acid, α-chlorobutyric acid, etc.; acid chlorides, e.g., acetyl chloride, acetyl bromide, propionyl chloride, η-butyryl chloride, chloroacetic chloride, etc.; substituted allyl halides, e.g., allyl chloride, methyl allyl chloride, etc.; carboxyl acid anhydrides, e.g., acetic anhydride, etc.; organic esters, e.g., ethyl acetate, methyl propionate, propyl formate, methyl formate, ethyl formate, methyl acetate, ethyl chloroacetate, etc.; substituted hydroxyl compounds such as alkene halohydrins, e.g., ethylene chlorohydrin, ethylene bromohydrin, glyceryl monochlorohydrin, etc.; epihalohydrins, e.g., epichlorohydrin, etc.; substituted benzene compounds, e.g., benzyl chloride, benzal chloride, nitrobenzene, p-chlorobenzoic acid, etc., and mixtures thereof. Mixture of mono-substituted and polysubstituted organic compounds may be used in this invention. The preferred substituted compound is ethylene chloride.

Any suitable aldehyde may be used in this invention, such as formaldehyde, acetaldehyde, butyl aldehyde, chloral, acrolein, furfural, benzaldehyde, crotonaldehyde, propionaldehyde, pentanals, hexanals, heptanals, octanals, and their simple substitution products, semi-acetate and full acetals, paraformaldehyde and mixtures thereof. Compounds containing active aldehyde groups such as hexamethylene tetramine may also be used.

Any suitable polyisocyanate or polyisothiocyanate may be used in this invention, including aliphatic, cycloaliphatic, araliphatic, aromatic and heterocyclic polyisocyanates and mixtures thereof, such as, for example, arylene polyisocyanates such as tolylene; metaphenylene; 4-chlorophenylene-1,3; methylene-bis(phenylene-4); biphenylene-4,4'; 3,3'-dimethoxybiphenylene-4,4'; 3,3'-dimethoxybiphenylene-4,4'; 3,3'-diphenylbiphenylene-4,4'; naphthalene-1,5; and tetrahydronaphthalene-1,5-diisocyanate and triphenylmethane triisocyanate; alkylene polyisocyanates such as ethylene; ethylidine; propylene-1,2; butylene-1,4; butylene-1,3; hexylene-1,6; decamethylene-1,10; cyclohexylene-1,2; cyclohexylene-1,4; and methylene-bis(cyclohexyl-4,4) diisocyanates. Phosgenation products of aniline-formaldehyde condensation may be used, such as polyphenyl-polymethylene polyisocyanates. Polyisothiocyanates, inorganic polyisothiocyanates, polyisocyanates which contain carbodiimide groups as described in German Pat. No. 1,092,007 and polyisocyanates which contain urethane groups, allophanate groups, isocyanurate groups, urea groups, imide groups or biuret groups may be used to produce polyisocyanate silicate prepolymers or polyisocyanate organic silicate solid or cellular solid products. Mixtures of the above-mentioned polyisocyanates may be used.

It is generally preferred to use commercial, readily available polyisocyanates such as toluene-2,4- and -2,6-diisocyanate and any mixtures of these isomers, commercially known as "TDI", polyphenyl-polymethylene-isocyanates obtained by aniline-formaldehyde condensation followed by phosgenation, commercially known as "crude MDI", and modified polyisocyanates which contain carbondiimide groups, urethane groups, allophanate groups, isocyanurate groups, urea groups, imide groups or biuret groups ("modified polyisocyanates") and mixtures thereof.

Other polyisocyanates may be used in this invention, such as polyisocyanates which contain ester groups such as those listed in British Pat. Nos. 956,474 and 1,086,404; in U.S. Pat. Nos. 3,281,378 and 3,567,763; polyisocyanate reaction products with acetals according to German Pat. No. 1,072,385; polyisocyanates prepared by telomerization reactions as described in Belgian Pat. No. 723,640; polyphenyl-polymethylene polyisocyanates as described in British Patent Specification Nos. 874,430 and 848,671; polyisocyanates which contain carbondiimide groups as described in German Pat. No. 1,092,007; perchlorinated arylpolyisocyanates such as those described, e.g., in German Pat. No. 1,157,601; polyisocyanates which contain allophanate groups as described, e.g., in British Pat. No. 994,890 and in Belgian Pat. No. 761,628; and the diisocyanates described in U.S. Pat. No. 3,492,330; polyisocyanates which contain biuret groups as described, e.g., in German Pat. No. 1,101,394; in British Pat. No. 889,050; and in French Pat. No. 7,017,514; polyisocyanates which contain isocyanurate groups as described, e.g., in German Pat. Nos. 1,022,789 and 1,027,394; and in British Pat. Nos. 1,091,949; 1,267,011 and 1,305,036; polyisocyanates which contain acrylated urea groups according to U.S. Pat. No. 3,517,139; and polyisocyanates which contain urethane groups as described, e.g., in Belgian Pat. No. 752,261; or in U.S. Pat. No. 3,394,164. Mixtures of the above-named polyisocyanates may be used. Organic polyisocyanates which are modified with ionic groups, for example, with carboxyl and/or carboxylate groups and/or sulphonic acid groups and/or sulphonate groups may be used with the polyisocyanates in this invention.

Polyisocyanates may be reacted with alkali metal silicates such as sodium metasilicate pentahydrate, potassium metasilicate pentahydrate, dry granular crude sodium silicate, and dry granular lithium silicate to produce polyisocyanate alkali metal silicate prepolymer with terminal isocyanate groups or terminal alkali metal silicate groups and may be used with the polyisocyanates in this invention. The polyisocyanate is mixed with the dry granular alkali metal silicate, then heated to 30° C. to 40° C. while agitating at ambient pressure for 10 to 30 minutes, thereby producing a polyisocyanate prepolymer. Any of the suitable non-ionic hydrophilically modified organic polyisocyanates may be used in this invention.

Suitable polyisocyanates such as the aromatic diisocyanates may be reacted with organic compounds which contain at least two hydrogen atoms capable of reacting with isocyanates, preferably with a molecular weight of, generally, from 300 to about 10,000 and in the ratio of from 50 to 90 mols of aromatic diisocyanates with 1 to 50 mols of said organic compounds to produce isocyanate-terminated reaction products. It is preferred to use polyols (organic polyhydroxyl compound), in particular, compounds and/or polymers which contain from 2 to 8 hydroxyl groups, especially those with a molecular weight of from about 800 to about 10,000 and, preferably, from 1,000 to about 6,000, e.g., polyesters, polyethers, polythioethers, polyacetals, polycarbonates or polyester amides containing at least 2, generally from 2 to 8, but, preferably, from 2 to 4 hydroxyl groups, of the kind known for producing homogenous and cellular polyurethanes. Compounds which contain amide groups, thiol groups or carboxyl groups may be used. Polyhydroxyl compounds (polyols) which already contain urethane or urea groups, modified or unmodified natural polyols, e.g., castor oil, carbohydrates and starches, may also be used. Additional products of alkylene oxides with phenolformaldehyde resins or urea-formaldehyde resins are also suitable for the purpose of the invention. Polybutadiene polymers with free hydroxyl groups, polysulfide polymers, polybutadienestyrene copolymers and butadiene-acrylonitrile copolymer chains are also suitable for the purpose of the invention.

Polyesters (polyols) containing hydroxyl groups may be, for example, reaction products of polyhydric alcohols, preferably dihydric alcohols and polybasic, preferably dibasic, carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic and/or heterocyclic and may be substituted, e.g., with halogen atoms and may be unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohols (polyol) may be used such as, for example, ethylene glycol; propylene-1,2- and -1,3-glycol; butylene-1,4- and -2,3-glycol; hexane-1,6-diol; octane-1,8-diol; neopentyl glycol; cyclohexanedimethol(1,4-bis-hydroxymethylcyclohexane); 2-methylpropane-1,3-diol; gylcerol; trimethylol propane; hexane-1,2,6-triol; butane-1,2,4-triol; trimethylol ethane; pentaerythritol; quinitol, mannitol, sorbitol, glucose, starches, fructose, cane sugar, dextrines, castor oils, methylglycoside, diethylene glycol, triethylene glycol, tetraethylene glycol, polyethylene glycols, dipropyleneglycol, polypropylene glycols, dibutylene glycol and polybutylene glycols. The polyesters may also contain a proportion of carboxyl end groups. Polyesters of lactones, such as ε-caprolactone or hydroxycarboxylic acids, such as ω-hydroxycaproic acid, may also be used.

The polyethers with at least 2, generally from 2 to 8 and, preferably, 2 ro 3 hydroxyl groups, used according to the invention, are known and may be prepared, e.g., by the polymerization of epoxides, e.g., ethylene oxide, propyleneoxide, butylene oxide, tetrahydrofuran, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4'-dihydroxydiphenylpropane; aniline, ammonia, ethanolamine or ethylenediamine. Sucrose polyethers such as these described, e.g., in German Pat. Nos. 1,176,358 and 1,064,938 may also be used according to this invention. It is frequently preferred to use polyethers which contain predominantly primary OH groups (up to 90% by weight, based on the total OH group content of the polyether). Also suitable are polyethers modified with vinyl polymers such as those which may be obtained by polymerizing styrene or acrylonitrite in the presence of polyethers (U.S. Pat. Nos. 3,383,351; 3,304,273; 3,525,093 and 3,110,695; and German Pat. No. 1,152,536) and polybutadienes which contain OH groups.

"Polythioethers" mean, in particular, the condensation products of thiodiglycol with itself and/or with other glycols, dicarboxylic acids, formaldehyde, eminocarboxylic acids or amino alcohols. The products obtained are polythio-mixed ethers, polythioether esters or polythioether ester amides, depending on the co-component.

The polyacetals used may be, for example, the compounds which may be obtained from glycols, e.g., diethylene glycol, triethylene glycol (4,4'-dihydroxydiphenyldimethylmethane), hexanediol and formaldehyde. Polyacetals suitable for the invention may also be prepared by the polymerization of cyclic acetals.

The polycarbonates with hydroxyl groups used may be of the known kind, e.g., those which may be prepared by reacting diols, e.g., propane-1,3-diol; butane-1,4-diol and/or hexane-1,6-diol or diethylene glycol, triethylene glycol or tetraethylene glycol, with diarylcarbonates, e.g., diphenylcarbonate or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Examples of these compounds which are to be used, according to the invention, have been described, e.g., in High Polymers, Volume XVI, "Polyurethanes, Chemistry and Technology", published by Saunders-Frisch, Interscience Publishers, New York, London, Volume I, 1962, pages 32 to 42 and pages 44 to 54 and Volume II, 1964, pages 5 and 6 and pages 198 and 199; and in Kunststoff-Handbuch, Volume VII, Vieweg-Hochtlen, Carl-Hanser-Verlag, Munich, 1966, e.g., on pages 45 to 71.

Suitable modified organic polyisocyanates, as well as their prepolymers, especially those based on aromatic polyisocyanates, can also be subsequently modified to give ionic groups, for example, by reaction with sulfones, beta-lactones, and by grafting on acrylic acid, methacrylic acid or crotonic acid, for example, or by sulphuric acid, chlorosulphonic acid, oleum or sulphur trioxide and then used in the invention. In particular, organic polyisocyanates such as tolylene diisocyanate, diphenylmethane diisocyanate, hexamethylene diisocyanate and the known phosgenation products of the condensation products of aromatic monoamines, especially aniline and aldehyde, especially formaldehyde which is reacted with sulphuric acid, oleum or sulphur trioxide, may be used in this invention. Sulphonated polyisocyanates of this kind which generally still contain ureadione, urea and buret groups and, in particular, where polyol modification has been carried out before sulphonation, urethane and/or allophanate groups which are formed through secondary reactions during sulphonation are, therefore, particularly preferred as polyisocyanates containing ionic groups. The NCO-terminated prepolymers used, for example, for the production of aqueous polyurethane dispersions, (U.S. Pat. No. 3,756,992) can be used for the process according to the invention.

DETAILED DESCRIPTION OF THE INVENTION

The preferred process for producing alkali metal organic polyhydroxy lignin-cellulose polymer is to mix about 50 parts by weight of broken-down alkali metal lignin-cellulose polymer produced by mixing 2 to 5 parts by weight of an alkali metal hydroxide, selected from the group consisting of sodium hydroxide, potassium hydroxide and mixtures thereof, with 3 parts by weight of cellulose-containing plant particles, then heating the mixture to from 150° C. to 220° C. while agitating for 5 to 60 minutes, and adding 10 to 200 parts by weight of an organic polyhydroxy compound, then heating the mixture at a temperature between ambient temperature and the boiling temperature of the organic polyhydroxy compound while agitating for 30 to 120 minutes, thereby producing an alkali metal organic polyhydroxy lignin-cellulose polymer.

In an alternate method, a further step is taken wherein a salt-forming compound, in an amount wherein the salt-forming radicals are about equal to the alkali metal radical, is added, mixed and reacted with the alkali metal organic polyhydroxy lignin-cellulose polymer, thereby producing an organic polyhydroxy lignin-cellulose polymer and salt.

In another alternate method, a substituted organic compound or mixtures of substituted organic compounds, which have at least one substituent which will split off during the reaction to said broken-down alkali metal plant polymer in an amount wherein the mols of the alkali metal radicals in the mixture and the substituted radicals are about equal, are added with the organic polyhydroxy compound in the preferred process, thereby producing an organic polyhydroxy lignin-cellulose polymer.

In another alternate method, an aldehyde in the amount of 1 to 50 parts by weight is added with the organic polyhydroxy compound or broken-down alkali metal lignin-cellulose polymer in the preferred process, thereby producing an alkali metal organic polyhydroxy lignin-cellulose polymer.

In another alternate method, an aldehyde in the amount of 1 to 50 parts by weight is added to the alkali metal organic polyhydroxy lignin-cellulose polymer, then heated to a temperature between ambient temperature and the boiling temperature of the aldehyde while agitating for 30 to 120 minutes, thereby reacting the aldehyde with the alkali metal organic polyhydroxy lignin-cellulose polymer.

In another alternate method, an aldehyde in the amount of 1 to 50 parts by weight and a substituted organic compound or mixtures of substituted compounds, which have at least one substituent which will split off during the reaction to said broken-down alkali metal plant polymer in the amount wherein the mols of the alkali metal radicals in the mixture and the substituted radicals are about equal, are added with the organic polyhydroxy compound in the preferred process, thereby producing an organic polyhydroxy lignin-cellulose polymer.

In another alternate method, the alkali metal organic polyhydroxy lignin-cellulose polymer produced by the preferred process in an amount of 1 to 100 parts by weight are mixed with, and reacted with, 50 parts by weight of an organic polyisocyanate, thereby producing a polyurethane resinous product.

In another alternate method, the alkali metal organic polyhydroxy lignin-cellulose polymer produced by the preferred process in an amount of 1 to 100 parts by weight are reacted with 50 parts by weight of an organic polyisocyanate or polyisothiocyanate in the presence of up to 10% by weight of a polyisocyanate initiator, up to 50% by weight of a blowing agent, up to 5% by weight of an emulsifying agent and up to 20% by weight of a foam regulator, percentage based on the reactants, thereby producing a foamed polyurethane product.

In an additional step, the alkali metal organic polyhydroxy lignin-cellulose polymer produced by the preferred process, in an amount of 1 to 100 parts by weight, is mixed with 50 parts by weight of an organic polyisocyanate, up to 10% by weight of an initiator, up to 5% by weight of an emulsifier, up to 50% by weight of a blowing agent, boiling within the range of from −25° C. to 80° C., up to 100 parts by weight of a curing agent and up to 200% by weight of a water-binding agent, percentage based on the reactants, and are reacted, thereby producing a polyurethane silicate foam.

The reactants may be reacted in any suitable amounts, but preferably with the following range of amounts by weight:
(a) 50 parts by weight of broken-down plant polymer;
(b) 10 to 200 parts by weight of an organic polyhydroxy compound;
(c) 1 to 50 parts by weight of an aldehyde.

In the production of polyurethane foamed and resinous products, utilizing alkali metal organic polyhydroxy lignin-cellulose polymer, the reactants are reacted in the following proportions by weight:

(a) 1 to 100 parts by weight of alkali metal organic polyhydroxy lignin-cellulose polymer;
(b) 50 parts by weight of polyisocyanate or polyisothiocyanate;
(c) Up to 10% by weight of a polyisocyanate initiator;
(d) Up to 50% by weight of a blowing agent;
(e) Up to 5% by weight of an emulsifier;
(f) Up to 20% by weight of a foam regulator;
(g) Up to 100% by weight of a curing agent;
(h) Up to 200% by weight of a water-binding agent.

Percentages are based on the weight of the reactants.

DESCRIPTION OF PREFERRED EMBODIMENTS

My invention will be illustrated in greater detail by the specific examples which follow, it being understood that these preferred embodiments are illustrative of, but not limited to, procedures which may be used in the production of alkali metal organic polyhydroxy lignin-cellulose polymer.

EXAMPLE 1

About 20 parts by weight of caustic soda (NaOH) are heated to 150° C., then 20 parts by weight of particles of plants, listed below, are added and mixed, then agitated at 150° C. to 220° C. at ambient pressure for 5 to 60 minutes until the mixture softens and expands into a brown, thick liquid which solidifies on cooling, thereby producing a broken-down sodium plant product.

About 3 parts by weight of ethylene glycol are added and mixed with 2 parts by weight of the broken-down sodium plant product, then heated to just below the boiling temperature of the ethylene glycol while agitating for 30 to 120 minutes, thereby producing alkali metal polydroxy lignin-cellulose polymer.

| | |
|---|---|
| (a) oak sawdust; | (f) corn cobs; |
| (b) fir sawdust; | (g) cotton stalks; |
| (c) ash sawdust; | (h) bagasse; |
| (d) seaweed; | (i) paper; |
| (e) cotton | (j) oat straw. |

EXAMPLE 2

About 3 parts by weight of caustic soda (NaOH) are heated to between 150° C. and 220° C., then 4 parts by weight of fir sawdust are added and mixed, then agitated for 5 to 60 minutes, thereby producing a broken-down alkali metal plant product. The reaction is exothermic and must be cooled to avoid burning the plant particles.

About 4 parts by weight of an organic polyhydroxy compound, listed below, and 3 parts by weight of the broken-down alkali metal plant product are mixed, then heated to a temperature just below the boiling point of the organic polyhydroxy compound while agitating for 30 to 120 minutes, thereby producing an alkali metal organic polyhydroxy lignin-cellulose polymer.

| | |
|---|---|
| (a) ethylene glycol; | (e) dipropylene glycol; |
| (b) propylene glycol; | (f) triethylene glycol; |
| (c) glycerol; | (g) tripropylene glycol; |
| (d) diethylene glycol; | (h) propylene-1,2-glycol; |
| (i) propylene-1,3,glycol; | (n) polyethylene glycol (mol. wt. 320); |
| (j) butylene-1,4-glycol; | (o) polypropylene glycol (mol. wt. 500); |
| (k) butylene-2,3-glycol; | (p) resorcinol; |
| (l) trimethylol propane; | (q) Bisphenyl A |
| (m) trimethylol ethane; | |

EXAMPLE 3

Example 1 is modified wherein 5 parts by weight of formaldehyde gas are added in a closed system with the organic polyhydroxy compound, thereby producing an alkali metal aldehyde organic polyhydroxy lignin-cellulose polymer.

Other aldehydes may be used in place of formaldehyde such as acetaldehyde, butyl aldehyde, chloral, acrolein, furfural, benzaldehyde, crotonaldehyde, propionaldehyde, pentanals, hexanals, heptanals, octanals and their simple substituted products, semi-acetate and full acetals, paraformaldehyde and mixtures thereof.

EXAMPLE 4

Example 2 is modified wherein a substituted compound, listed below, is added in a closed system with the organic polyhydroxy compound in an amount wherein the substituted radicals which split off to react with the alkali metal radicals are about equal to the alkali metal radicals, thereby producing an organic polyhydroxy lignin-cellulose polymer.

| | |
|---|---|
| (a) ethylene chlorohydrin; | (g) chloroform; |
| (b) ethylene chloride; | (h) bis(2-chloroethyl)ether; |
| (c) methylene chloride; | (i) para-dinitrobenzene; |
| (d) sodium chloroacetate; | (j) 1,3-dichloro-2-propanol; |
| (e) vinyl acetate; | (k) 1,3-dibromopropane; |
| (f) vinylidene chloride; | (l) dichloriethyl carbonate; |
| (m) 1,1,2-trichloroethane; | (t) 1-mitropropane; |
| (n) trichlorotrifluoroethane; | (u) propyl hydrogen phosphate; |
| (o) propane-1-hydrogen sulfate; | (v) acetyl chloride; |
| (p) ethyl sulfate; | (w) allyl halide; |
| (q) diethyl oxalate; | (x) acetic anhydride; |
| (r) p-chlorobenzyl; | (y) ethyl chloroacetate; |
| (s) epichlorohydrin; | (z) glycerol monochlorohydrin. |

EXAMPLE 5

Example 1 is modified wherein about 5 parts by weight of an aldehyde, listed below, and a substituted organic compound, listed below, in amount wherein the substituent radicals are about equal to the alkali metal radicals, is added with the organic polyhydroxy compound in a closed system, thereby producing an organic polyhydroxy lignin-cellulose polymer.

| Example | Aldehyde | Substituted organic compound |
|---|---|---|
| a | Formaldehyde; | Ethylene chlorohydrin; |
| b | Acetaldehyde; | Ethylene chloride; |
| c | Furfural; | Propane-1-hydrogen sulfate; |
| d | Acrolein; | Ethylene chloride; |
| e | Benzaldehyde; | Ethylene chloride; |
| f | Crotonaldehyde; | Epichlorohydrin; |
| g | Butyl aldehyde; | Allyl chloride; |
| h | Paraformaldehyde; | Diethyl acetate; |
| i | Formaldehyde; | 1-nitropropane; |
| j | Acetaldehyde; | Vinyl acetate; |
| k | Formaldehyde; | Methyl methacrylate; |
| l | Formaldehyde; | Chloroacetic acid. |

EXAMPLE 6

About equal parts by weight of polyphenyl-polymethylene-isocyanates, with an NCO content of about 30% by weight, and an alkali metal organic polyhydroxy lignin-cellulose polymer, as produced in the examples listed below, are reacted, thereby producing a tough brown polyurethane product.

| Example | Alkali metal organic polyhydroxy lignin-cellulose polymer of: |
|---|---|
| a | Example 2a; |
| b | Example 2b; |
| c | Example 2c; |
| d | Example 2d; |
| e | Example 2e; |
| f | Example 2f; |
| g | Example 2g; |
| h | Example 1a; |
| i | Example 1b; |
| j | Example 1c; |
| k | Example 1d; |
| l | Example 1e; |
| m | Example 1f; |
| n | Example 1g; |
| o | Example 1h; |
| p | Example 1i; |
| q | Example 1j. |

Other polyisocyanates may be used in place of polyphenyl-polymethylene-isocyanates such as tolylene diisocyanate, methylene bis-phenyl diisocyanate, 4,4'-diphenylmethane diisocyanates, hexamethylene diisocyanate and the like.

EXAMPLE 7

About equal parts by weight of an isocyanate-terminated polyurethane prepolymer, as listed below, and the alkali metal organic polyhydroxy lignin-cellulose produced in Example 1b are thoroughly mixed at ambient temperature and pressure, thereby producing a solid polyisocyanate product.

| Example | Isocyanate-terminated polyurethane prepolymer |
|---|---|
| a | Polyphenyl-polymethane isocyanate with polyethylene oxide monohydric alcohol (mol. wt. 1100), initiated on trimethylol propane to produce a prepolymer with an NCO content of about 18%; |
| b | Tolylene diisocyanate with polyethylene (mol. wt. 1000) to produce a prepolymer with an NCO content of about 24%; |
| c | Residue of tolylene diisocyanate distillation with about 20% by weight of NCO with polyethylene glycol (mol. wt. 1500) to produce a prepolymer with an NCO content of about 10%; |
| d | Tolylene diisocyanate with castor oil to produce a prepolymer with an NCO content of about 15%; |
| e | 4,4'-diphenylmethylene diisocyanate with a liquid polyepichlorohydrin to produce a prepolymer of about 16% |
| f | Tolylene diisocyanate with a polyester (4 mols of glycerol, 2.5 mols of adipic acid and 0.5 mol of phthalic anhydride) to produce a prepolymer with an NCO content of about 20%; |
| g | Tolylene diisocyanate with a liquid hydroxyl-group-containing polysulfide polymer to produce a prepolymer with an NCO content of about 17%. |

EXAMPLE 8

About 20 parts by weight of alkali metal organic hydroxy lignin-cellulose polymer as produced in 1a, 18 parts by weight of polyphenyl-polymethylene-isocyanates, 0.5 part by weight of triethylene diamine, 0.01 part by weight of tin octoate, 0.2 part by weight of a water-soluble polyester siloxane and 15 parts by weight of trichlorotrifluoroethane are thoroughly mixed. The mixture begins to expand in 15 to 120 seconds, thereby producing a rigid polyurethane foam.

EXAMPLE 9

Example 8 is modified by adding 30 parts by weight of Portland cement. After the rigid polyurethane foam has cured, it is placed in water to cure the cement.

EXAMPLE 10

About 20 parts by weight of an isocyanate-terminated tolylene diisocyanate-ethylene glycol prepolymer with an NCO content of about 18%, 20 parts by weight of alkali metal organic polyhydroxy lignin-cellulose polymer, as produced in Example 2a, 0.2 part by weight of triethylamine, 0.3 part by weight of dimethylethanolamine, 0.01 part by weight of tin acetate, 3 parts by weight of methylene chloride, 2 parts by weight of water, and 10 parts by weight of powdered silica are mixed thoroughly. The mixture begins to expand in 15 to 120 seconds, thereby producing a rigid polyurethane foam.

EXAMPLE 11

Example 10 is modified by adding 10 parts by weight of Portland cement.

Other water-binding agents may be added in place of Portland cement, such as other hydraulic cements, gypsum, burnt lime and synthetic anhydrites.

EXAMPLE 12

About 20 parts by weight of 4,4'-diphenylmethane diisocyanate and 20 parts by weight of an organic polyhydroxy lignin-cellulose polymer, listed below, are mixed and reacted, thereby producing a solid polyurethane product.

| Example | Organic polyhydroxy lignin-cellulose polymer |
|---|---|
| a | of Example 4a; |
| b | of Example 4b; |
| c | of Example 4d; |
| d | of Example 4e; |
| e | of Example 4q; |
| f | of Example 4s; |
| g | of Example 4w; |
| h | of Example 5a; |
| i | of Example 5b; |
| j | of Example 5c; |
| k | of Example 5f; |
| l | of Example 5j. |

EXAMPLE 13

Example 12 is modified by adding 10 parts by weight of Portland cement and 3 parts by weight of water.

EXAMPLE 14

About 20 parts by weight of phosgenated product of formaldehyde aniline condensation with an NCO content of about 31% by weight, 20 parts by weight of an organic polyhydroxy lignin-cellulose polymer, listed below, a part by weight of tin octoate, 0.2 part by weight of triethylenediamine, 0.2 part by weight of dimethylethanolamine, 2 parts by weight of acetone, 3 parts by weight of trichlorotrifluoroethane and 0.5 part by weight of a silicone surfactant (L5340 produced by Union Carbide) are thoroughly mixed. The mixture begins to expand in 15 to 120 seconds, thereby producing a rigid polyurethane foam.

| Example | Organic polyhydroxy lignin-cellulose polymer |
|---|---|
| a | of Example 4a; |
| b | of Example 4b; |
| c | of Example 4c; |
| d | of Example 4e; |
| e | of Example 4f; |
| f | of Example 4h; |
| g | of Example 4j; |
| h | of Example 4v; |
| i | of Example 4y; |
| j | of Example 4z; |
| k | of Example 5a; |
| l | of Example 5b; |
| m | of Example 5d; |
| n | of Example 5h; |
| o | of Example 5j. |

EXAMPLE 15

Example 14 is modified by adding 20 parts by weight of Portland cement and 20 parts by weight of plasterers' sand.

EXAMPLE 16

About 20 parts by weight of an alkali metal polyhydroxy lignin-cellulose polymer, listed below, is mixed with a salt-forming compound, listed below, in an amount wherein the alkali metal radicals are about equal to the salt-forming radicals, thereby producing a polyhydroxy lignin-cellulose polymer.

| Example | Alkali metal organic polyhydroxy lignin-cellulose polymer | Salt-forming compound |
|---|---|---|
| a | of Example 1a; | Hydrochloric acid; |
| b | of Example 1b; | Sulfuric acid; |
| c | of Example 2a; | Phosphoric acid; |
| d | of Example 2b; | Acetic acid; |
| e | of Example 2c; | Nitric acid; |
| f | of Example 3; | Sodium hydrogen sulfate. |

EXAMPLE 17

Example 16 is modified by adding 20 parts by weight of the phosgenated condensation product of formaldehyde aniline with an NCO content of about 30% by weight, thereby producing a polyurethane foam.

Although specific conditions and ingredients have been described in conjunction with the above Examples of preferred wmbodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:
1. The process for the production of alkali metal polyhydroxy lignin-cellulose polymer by mixing, heating and reacting the following components:
  (a) In an amount of 50 parts by weight, broken-down alkali metal plant polymer which has been produced by mixing 2 to 5 parts by weight of an alkali metal hydroxide, selected from the group consisting of sodium hydroxide, potassium hydroxide and mixtures thereof, with 3 parts by weight of cellulose-containing plant particles, then heating the mixture at from 150° C. to 220° C. while agitating for 5 to 60 minutes;
  (b) In an amount of 10 to 200 parts by weight, an organic polyhydroxy compound; the mixture is heated at a temperature between ambient temperature and the boiling temperature of the organic polyhydroxy compound while agitating for 30 to 120 minutes.

2. The process of claim 1 wherein the organic polyhydroxyl compound is selected from the group consisting of ethylene glycol, propylene-1,2- and -1,3-glycol, butylene-1,4- and -2,3-glycol, hexane-1,6-diol, octane-1,8-diol, neopentyl glycol, cyclohexanedimethol(1,4-bis-hydroxymethylcyclohexane), 2-methyl-propane-1,3-diol, glycerol, trimethylol propane, hexane-1,2,6-triol, trimethylol ethane, pentraerythritol, diethylene glycol, polyethylene glycol, polypropylene glycol, polybutylene glycol, polyether diols, polyether triols and polyether polyhydroxy compounds.

3. The product produced by the process of claim 1.

4. The process of claim 1 wherein a salt-forming compound is mixed and reacted with the alkali metal organic polyhydroxy lignin-cellulose polymer in an amount wherein the salt-forming radicals are about equal to the alkali metal radicals, thereby producing organic polyhydroxy lignin-cellulose polymer and salt.

5. The product produced by the process of claim 4.

6. The process of claim 1 wherein a substituted organic compound and mixtures thereof, having at least one carbon atom which is attached to at least one substituent which will split off during the reaction to said broken-down alkali metal plant polymer in the amount wherein the mols of the alkali metal radicals in the mixture and the substituted radicals are about equal, are added with the organic polyhydroxy compound, thereby producing an organic polyhydroxy lignin-cellulose polymer.

7. The process of claim 6 wherein the substituent is selected from the group consisting of halogens, acid sulfate, nitrate, acid phosphate, bicarbonate, formate, acetate, propionate, laurate, oleate, stearate, oxalate, acid malonate, acid tartrate, acid citrate and mixtures thereof.

8. The product produced by the process of claim 6.

9. The process of claim 6 wherein the substituted organic compound is ethylene chloride.

10. The process of claim 1 wherein an aldehyde, in an amount of 1 to 50 parts by weight, selected from the group consisting of formaldehyde, acetaldehyde, butyl aldehyde, chloral, acrolein, furfural, benzaldehyde, crotonaldehyde, propionaldehyde, pentanals, hexanals, heptanals, octanals and their simple substitution products, semi-acetate and full acetals, paraformaldehyde and mixtures thereof, is added to, and reacted with, the alkali metal organic polyhydroxy lignin-cellulose polymer.

11. The process of claim 10 wherein the aldehyde is formaldehyde.

12. The product produced by the process of claim 10.

13. The process of claim 10 wherein the aldehyde is added with the organic polyhydroxy compound.

14. The process of claim 1 wherein 50 parts by weight of an organic polyisocyanate or polyisothiocyanate are mixed with 1 to 100 parts by weight of the alkali metal organic polyhydroxy lignin-cellulose polymer which was produced by the process of claim 1 and allowed to react, thereby producing a polyurethane resinous product.

15. The product produced by the process of claim 14.

16. The process of claim 14 wherein the polyisocyanate is selected from the group consisting of aliphatic, cycloaliphatic, araliphatic, aromatic and heterocyclic polyisocyanates and mixtures thereof.

17. The process of claim 14 wherein the polyisocyanate is a phosgenation product of aniline-formaldehyde condensation.

18. The process of claim 1 wherein 50 parts by weight of an organic polyisocyanate or polyisothiocyanate, up to 10% by weight of a polyisocyanate initiator, up to 50% by weight of a blowing agent, up to 5% by weight of an emulsifying agent and up to 20% by weight of a foam regulator are mixed with 1 to 100 parts by weight of the alkali metal organic polyhydroxy lignin-cellulose polymer which was produced by the process of claim 1, then reacted, thereby producing a polyurethane foam product, percentage based on the reactants.

19. The product produced by the process of claim 18.

20. The process of claim 18 wherein the polyisocyanate is selected from the group consisting of tolylene diisocyanate, polyphenyl-polymethylene-isocyanates and mixtures thereof.

21. The process of claim 18 wherein the initiator catalyst is selected from the group consisting of tertiary amine, organic tin compound and mixtures thereof.

22. The process of claim 18 wherein the blowing agent is a halogenated organic compound which boils within the range of from −25° C. to 80° C.

23. The process of claim 1 wherein 50 parts by weight of an organic polyisocyanate, up to 10% by weight of an initiator, up to 5% by weight of an emulsifier, up to 50% by weight of a blowing agent, boiling within the range of from −25° C. to 80° C., up to 100 parts by weight of a curing agent, and up to 200% by weight of a water-binding agent, percentage based on the weight of the reactants, are mixed with the alkali metal organic polyhydroxy lignin-cellulose polymer and reacted, thereby producing a polyurethane silicate foam.

24. The process of claim 23 wherein the polyisocyanate is a phosgenated product of aniline-formaldehyde condensation.

25. The process of claim 23 wherein the water-binding agent is selected from the group consisting of hydraulic cement, burnt lime, gypsum and synthetic anhydrite.

26. The process of claim 23 wherein the curing agent is selected from the group consisting of water, aqueous sodium silicate solution, aqueous suspension of hydrated silica and mixtures thereof.

27. The product produced by the process of claim 23.

28. The process of claim 23 wherein the initiator is selected from a group consisting of a tertiary amine, organic tin compound and mixtures thereof.

29. The process of claim 1 wherein an aldehyde, in the amount of 1 to 50 parts by weight, and a substituted organic compound or mixtures of substituted compounds which have at least one substituent which will split off during the reaction to said broken-down alkali metal plant polymer, in the amount wherein the mols of the alkali metal radicals in the mixture and in the substituted radicals are about equal, are added with the organic polyhydroxy compound in claim 1, thereby producing an organic polyhydroxy lignin-cellulose polymer.

30. The product produced by the process of claim 29.

* * * * *